(No Model.)

E. WESTON.
ELECTRICAL MEASURING INSTRUMENT.

No. 529,434. Patented Nov. 20, 1894.

WITNESSES:
Gustave Dieterich.
H. R. Moller.

INVENTOR
Edward Weston
BY
Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 529,434, dated November 20, 1894.

Application filed October 3, 1892. Serial No. 447,678. (No model.)

*To all whom it may concern:*

Be it known that I, EDWARD WESTON, of Newark, Essex county, New Jersey, have invented a new and useful Improvement in Electrical Measuring-Instruments, of which the following is a specification.

The principle of my invention consists in disposing a coil arranged on one arm of a lever and counterbalanced in the field of force of a fixed and parallel coil, and in opposing the movement of the lever by a spring which will weigh the force due to the mutual reaction of the fields of the two coils.

My invention consists in an instrument for the measurement of electrical currents which is so constructed and arranged that the movement of the index at the beginning of its path will be substantially as great for equal applied force increments as at the end of its path. In this way I produce an apparatus having material advantages over other forms of apparatus embodying a fixed coil and a movable coil in which the initial deflections of the index are very small and which, therefore, are adapted better for high ranges of potential difference than for low ranges. By my present apparatus, inasmuch as equal applied force increments produce substantially equal deflections of the index all over the scale, it is clear that feeble currents may be measured with the same certainty and accuracy as large ones.

My invention consists more particularly in the construction and arrangement of the coils. The movable coils are balanced upon opposite arms of a vibrating lever, which lever is supported by the pivot shaft, which pivot shaft in turn carries the index needle, which moves over a suitable scale. The movement of the pivot shaft is opposed by coiled springs. Two fixed coils are arranged in inductive proximity to the movable coils and have their faces parallel to the plane of said movable coils, by which arrangement the coils are brought into such position as that their fields will most strongly react at the beginning of the establishment of the current.

My invention consists also in certain details of construction which are more particularly pointed out in the claims.

Figure 1:
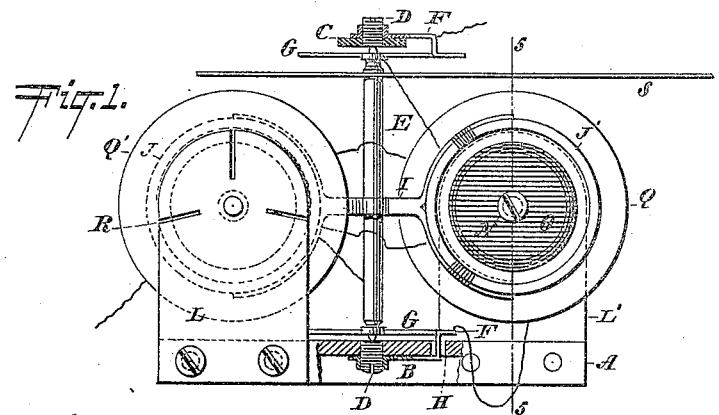
Figure 2:
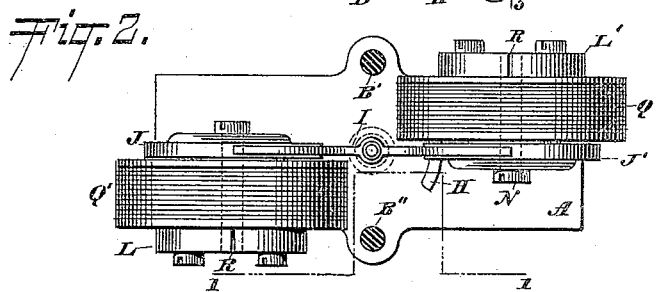
Figure 3:
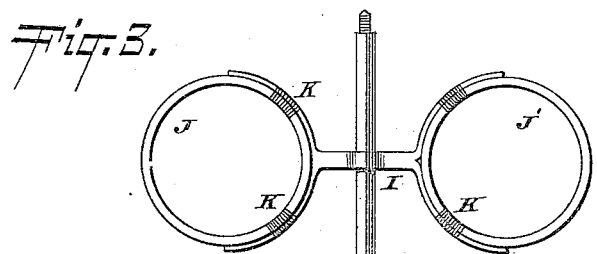
Figure 4:
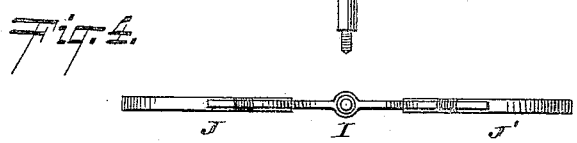
Figure 5:
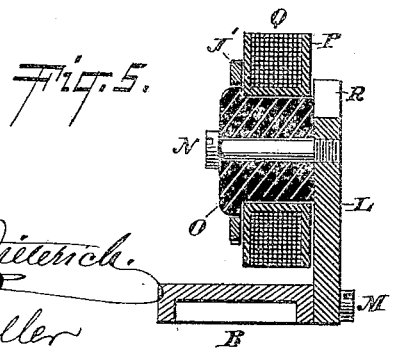

In the accompanying drawings, Figure 1 is an elevation and partial section of the working parts of my instrument, the section being taken on the line 1, 1 of Fig. 2. Fig. 2 is a top view of the same parts below the index needle. Fig. 3 shows the pivoted and the movable coils separately and in elevation. Fig. 4 is a top view of the parts shown in Fig. 3. Fig. 5 is a vertical section on the line 5, 5 of Fig. 1.

Similar letters of reference indicate like parts.

For purposes of clearness, the containing box of the instrument and the scale-plate have been omitted, inasmuch as these parts do not differ materially from those which I have repeatedly illustrated in Letters Patent No. 392,386, granted to me November 6, 1888, and in numerous subsequent Letters Patent.

A is a bottom plate from which rise two fixed posts or standards B' B'', Fig. 2, which serve to support a cross-bar, a portion of which is shown at C in Fig. 1. In the bottom plate and in the cross-bar C are screw-plugs or steps, D, which form bearings for the ends of the short pivot shaft E; also surrounding these screw-plugs D and pivoted thereon are arms, F, which arms have their ends bent over to connect them to the outer extremities of spiral springs, G, the inner extremities of which springs are fastened to the pivot shaft E. The bent-over end of the lower arm F passes through a curved slot, H, in the bottom plate B. This mode of supporting the pivot shaft and the arrangement of the springs and the adjusting arms thereof has been fully described by me in prior patents as above stated. The pivot shaft E supports, at its middle portion, arms, I, to which arms are secured two coils, J and J', of fine, insulated wire. These coils are secured by suitable lashings or seizings, K, to the arms I. The coils J are to be loop conductors of as many turns or of such form as may be desired. I construct them preferably of several turns of fine, insulated wire, which turns are cemented together to produce a substantially solid mass.

Extending upward from the bottom plate B are two flat posts or standards, L and L', of metal; these posts being secured to the bottom plate B by a screw, such as M. Each post has a screw-threaded opening to receive a headed bolt, N, which bolt passes through a longitudinal aperture in the headed plug O. The plug receives upon its body portion a spool, P, which carries a coil of insulated wire, Q. A similar arrangement of parts exists in connection with the standard L, by means of which the coil Q' is supported.

It will be observed that the movable coils J J' surround the headed plugs O, Fig. 5, and when the instrument is not in operation, stand parallel to the fixed coils. The standards L are slit, as shown at R, Fig. 1, in order to prevent induced currents therein.

This instrument is intended as a means of measuring either the pressure or strength of alternating currents, and its circuits will be arranged to adapt it for whichever purpose it is selected. If it is to be used as a voltmeter, the two movable coils J and J' are made of thin wire and are to be connected in series with the fixed coils; the circuit, in such case, proceeding from one movable arm, as F, to the coiled spring G, to either coil J or J', to the other coil, to the pivot post E, opposite spring G and opposite arm F, and thence successively to the fixed coils Q and Q'; or, the circuit may proceed from one fixed coil to the two movable coils and to the other fixed coil. When the instrument is intended for use as an ammeter, the fixed coils Q and Q' will be made of large wire and the moving coils J and J' will be arranged in shunt therewith; the fixed coils and the movable coils being so proportioned as that a known percentage of the current shall pass through the shunt. In such case, of course the main circuit will lead first to one fixed coil, as Q', and then to the other fixed coil, as Q, and the shunt circuit will pass, as before, through the arms, springs and post E and the movable coils J and J'.

The construction of the coils to suit any desired purpose for which the instrument may be intended, or to produce fields of appropriate strength, can easily be determined by the electrical workman without further instructions.

A special feature of this instrument, to which I desire to call particular attention, is that the fixed coils have their faces parallel both to each other and to the plane of the movable coils when the latter are at rest. Therefore, as shown in Fig. 5, the movable coils normally stand closely approximating the faces of the fixed coils. It will be obvious that by this construction the movable coils are located in the positions of greatest sensibility in the field, and that as the force increases, tending to move them, they move into positions of less sensibility. It will, of course, be understood that as the movable coils are repelled by the fixed coils, the force exerted upon them is a couple tending to rotate the shaft E on its axis. This shaft E carries a needle, S, the extremity of which is disposed over a suitable scale. The force acting upon the movable coils varies as the square of the current strength and the needle deflections are very closely proportional thereto. The special advantage which I here gain is that by reason of the coils being in an intense part of the field at the very beginning, the deflections of the needle at its starting point on the scale are not at a minimum increasing to a maximum as the deflection angle becomes greater, owing to the augmented force, but are substantially as large at the beginning of the movement of the index as they are at the end; or, in other words, I may here use a scale laid off or spaced for given units equally throughout its entire length, and starting from an inferred zero point and in this way I can make measurements with much greater accuracy and convenience than is possible with instruments in which the scale intervals are very small at the beginning of the range of deflection and very large at the end. It will also be observed that the two movable coils J and J' are placed at equal distances from the pivot center, and hence equilibrate one another. They are also made alike as to number of turns, size of wire, &c. They are rendered astatic by being wound in opposite directions. The projecting ends of the plugs O, Fig. 5, enter the openings in the annular coils J and J', and may thus serve as guides for determining the position of said coils.

By the term "normal position" herein used with reference to the movable coils I mean the position of said coils which they asssume when no current is passing through the instrument.

I claim—

1. In an electrical measuring instrument, a fixed coil, a movable coil in inductive proximity to said fixed coil and a spring opposing the movement of said movable coil; the aforesaid parts being constructed and arranged substantially as hereinbefore set forth whereby the moving coil, through the mutual reaction of its field with that of the fixed coil, will be caused to travel over substantially equal distances for equal applied force increments throughout its range of motion.

2. In an electrical measuring instrument, a fixed coil, a movable coil in inductive proximity to said fixed coil, a spring opposing the movement of said movable coil, an index actuated by said movable coil and a scale; the aforesaid parts being constructed and arranged substantially as hereinbefore set forth whereby the said index, at the beginning of its movement over the scale, will traverse intervals on said scale substantially equal to those traversed at the end of said movement.

3. In an electrical measuring instrument, a vibrating lever, a coil supported on one arm thereof, a means of equilibrating said coil and a fixed coil disposed in a plane parallel to that of the movable coil when said movable coil is in normal position and a spring opposing the vibratory movement of said lever.

4. In an electrical measuring instrument, a vibrating lever, a spring opposing the vibration of said lever, two coils supported in equilibrium on opposite arms of said lever and two fixed coils, each in inductive proximity to one of said movable coils; the said fixed coils being located in planes parallel to those of the movable coils when said movable coils are in normal position and disposed with reference to said movable coils so that the reaction of the fields due to a current traversing said coils shall cause a couple tending to vibrate said lever.

5. In an electrical measuring instrument, a pivot shaft, two counterbalancing coils supported on opposite sides of said shaft, two fixed coils each in inductive proximity to one of said movable coils and in parallel plane thereto and a spring opposing the vibration of said pivot shaft.

6. In an electrical measuring instrument, a pivot shaft, two counterbalancing coils supported on opposite sides of said shaft, two fixed coils each in inductive proximity to one of said movable coils and respectively located on opposite sides of a plane passing through said fixed coils and parallel to said plane and a spring opposing the vibration of said pivot shaft.

7. In an electrical measuring instrument, a pivot shaft, two counterbalancing coils supported on opposite sides of said shaft, two fixed coils each in inductive proximity to one of said movable coils and respectively located on opposite sides of a plane passing through said fixed coils and parallel to said plane and a spring opposing the vibration of said pivot shaft; the said coils being relatively so disposed that the reaction of their fields when traversed by a current shall cause the movable coils to be repelled from the fixed coils.

8. In an electrical measuring instrument, the combination of the plate B, pivot shaft E thereon, spring G connected to said pivot shaft and to an abutment, counterbalancing coils, J J', supported on said shaft E, standards L and fixed coils, Q Q', supported on said standards on opposite sides of the plane of coils J J' and in inductive proximity thereto.

9. In an electrical measuring instrument, the combination of the plate B, pivot shaft E thereon, spring G connected to said pivot shaft and to an abutment, counterbalancing coils, J J', supported on said shaft E, standards L and fixed coils, Q Q', detachably secured to said standards on opposite sides of and parallel to the plane of coils J J' and in inductive proximity thereto.

10. In an electrical measuring instrument, the combination of a fixed annular coil, Q, a plate or standard, I, plug or pin, O, entering said coil and having a longitudinal opening and a flanged head and a bolt, N, passing through said longitudinal opening and securing said plug to said standard.

11. In an electrical measuring instrument in combination with an annular coil supported and moving to and from its face, a fixed coil having upon said face a fixed central projection or guide adapted to enter the said annular coil.

12. In an electrical measuring instrument, in combination with the movable annular coil J, the fixed coil Q, the standard L' supporting said coil Q and plug O entering said fixed coil and secured to said standard; the said plug O having a projecting portion constructed to be received within said annular coil.

13. In an electrical measuring instrument, a flat metal plate or standard and a coil supported on one face thereof; the said plate being provided with one or more slits or openings substantially in the direction of a radius or radii of said coil.

EDWARD WESTON.

Witnesses:
A. H. HOEFER,
R. O. HEINRICH.